No. 824,108. PATENTED JUNE 26, 1906.
W. S. FULTON.
ROLLER SKATE.
APPLICATION FILED FEB. 4, 1905.
2 SHEETS—SHEET 1.
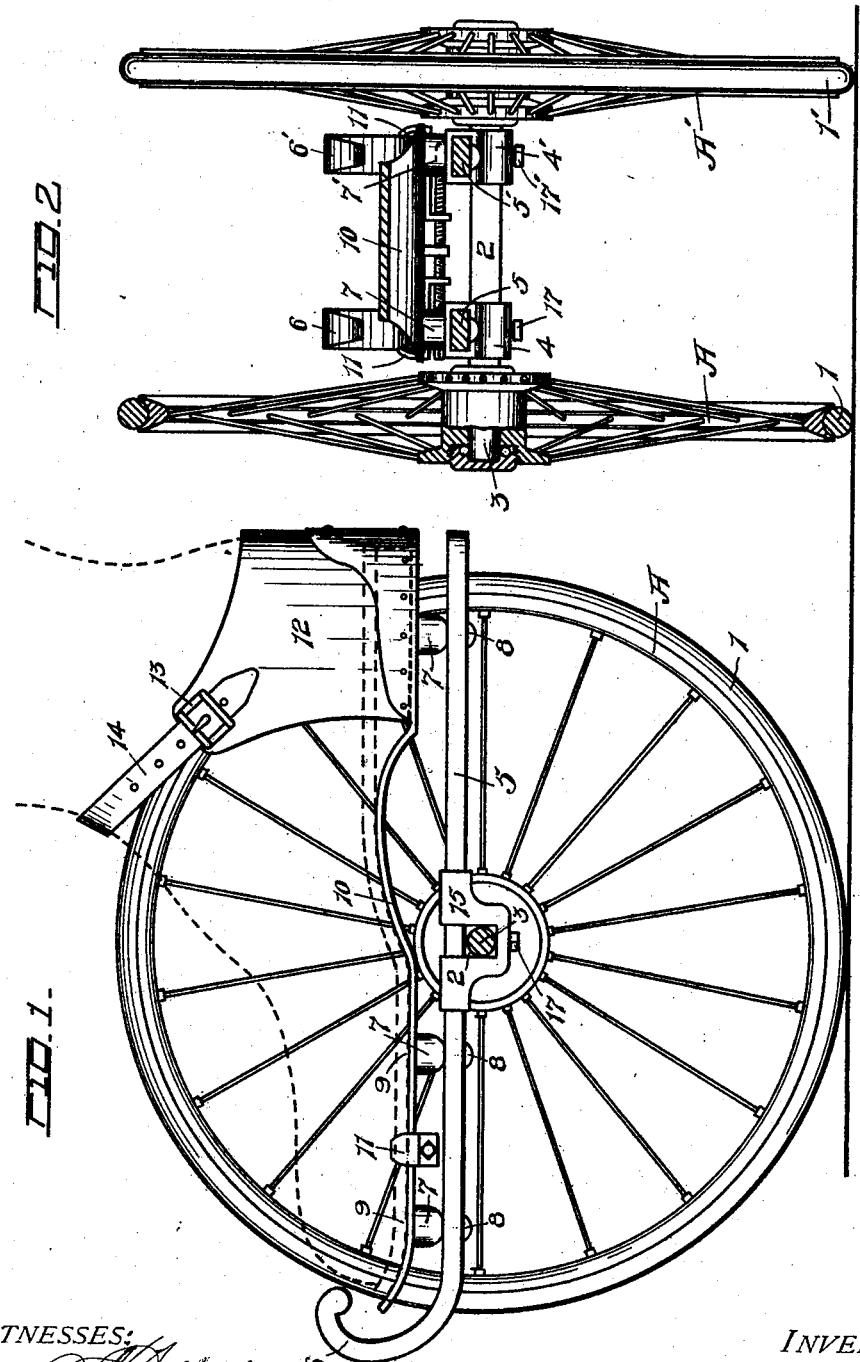
WITNESSES:
INVENTOR:
William S. Fulton.
BY John A. Griffin
Fredk J. Larson.
Attorneys.

No. 824,108. PATENTED JUNE 26, 1906.
W. S. FULTON.
ROLLER SKATE.
APPLICATION FILED FEB. 4, 1905.
2 SHEETS—SHEET 2.
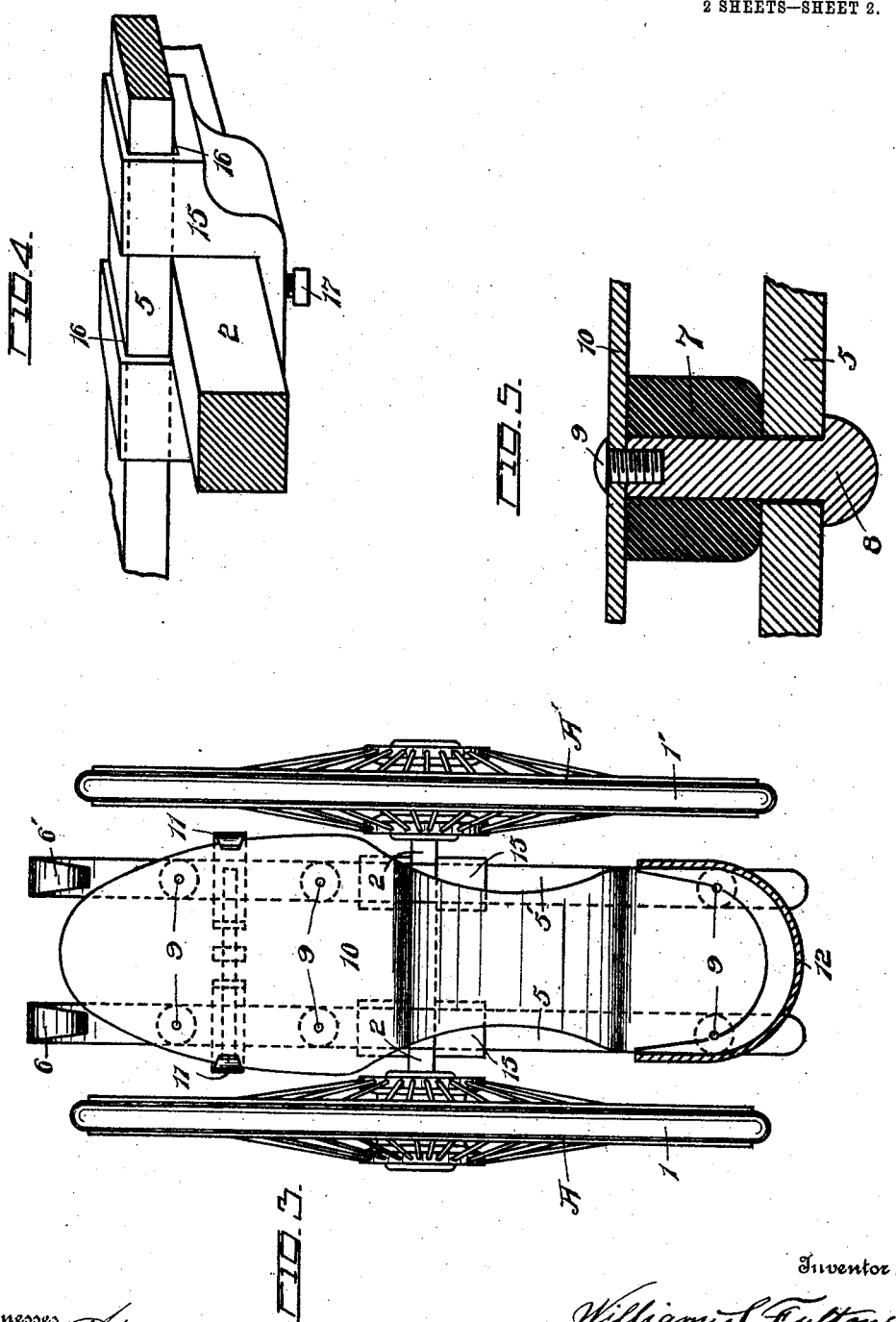

UNITED STATES PATENT OFFICE.

WILLIAM S. FULTON, OF OMAHA, NEBRASKA.

ROLLER-SKATE.

No. 824,108.      Specification of Letters Patent.      Patented June 26, 1906.

Application filed February 4, 1905. Serial No. 244,091.

*To all whom it may concern:*

Be it known that I, WILLIAM S. FULTON, a citizen of the United States, residing at Omaha, in the county of Douglas and State of Nebraska, have invented a new and useful Roller-Skate, of which the following is a specification.

My invention relates to certain improvements in roller-skates; and its object is to provide a skate of light and inexpensive construction, which will accommodate itself to the movement of the feet, and can be easily operated by the inexperienced skater, so as not to cause an undue strain either upon the ankle or the skate itself in turning or skating in one direction.

The invention also contemplates the provision of a rubber tire and rubber cushions or washers, together with other details of construction, all of which will be hereinafter fully set forth.

In the accompanying drawings I have clearly illustrated a skate embodying my improvements, in which—

Figure 1 shows a side elevation of my skate with one wheel removed, and Fig. 2 is a rear elevation with one wheel and the foot-plate in cross-section, while Fig. 3 is a plan of my skate, and Fig. 4 shows a perspective of the clamp, while Fig. 5 is a cross-section of the rubber cushion or washer.

In Fig. 1 I have shown the wheels A A' constructed similar to the wheel of a bicycle and having cushion-tires 1 1'. The wheels A A' are mounted on the opposite ends of a square axle 2, turned down at its ends to a round shaft 3, upon which the wheels rotate, said wheels being ball-bearing. To the axle 2, movably secured intermediate of the wheels A A' by means of the clamps 4 4', are the bars 5 5', which are at their forward ends curled upward to prevent their catching on the ground, as clearly shown at 6 6', said bars being provided with the rubber washers 7, which are held in position by means of the bolts 8, provided with screws 9, as clearly shown in Fig. 5. These bolts extend upwardly through the bars 5 5' and the washers 7 and butt against the lower face of the foot-plate 10, to which their upper ends are secured by means of the screws 9, which arrangement allows the spring or resiliency to be taken up by the sliding of the bolt 8 downward, said rubber washers being adapted to form a resilient support for the foot-plate 10, as clearly shown. In order to secure the skate to the shoe, as indicated by dotted lines in Fig. 1, I provide the forward end of the shoe-plate 10 with a suitable screw-clamp 11, which is provided with right and left threads, by means of which the same may be able to accommodate any size of shoe. To the rear end of the shoe-plate 10 I provide a suitable heel-strap 12, which is suitably secured to the plate 10, said heel-strap being provided with the buckle 13 and strap 14, as clearly shown in Fig. 1.

In referring to Fig. 4 I have shown one of my U-shaped clamps 15, provided at its upper ends with the openings 16 to admit the bars 5 5', said bars to be applied after the axle 2 has been put in place, said clamp provided with the set-screw 17, thus allowing the bars 5 5' to be secured to the axle 2 in the required position. The object of having these U-shaped clamps movable in relation to the bars 5 5' and the axle 2 is to provide a means whereby the skater may move the bars 5 5' backward or forward upon the axle 2, as may be desired.

My invention is susceptible of considerable modifications without material departure from its principles, and therefore I do not wish to limit myself to the precise construction and arrangements herein shown, and it is of course understood that these roller-skates may be made of any size and suitable material.

Having thus described my said invention, what I claim as new, and desire to secure by United States Letters Patent, is—

1. A roller-skate, comprising an axle, two wheels mounted upon said axle and adapted to rotate parallel to one another, two intermediate bars secured to said axle by means of screw-clamps and said bars having their forward ends curled upwardly to prevent their catching on the ground, substantially as described.

2. A roller-skate, comprising an axle and the wheels mounted upon the ends thereof, two intermediate bars secured to said axle, a foot-plate supported intermediate the wheels by means of the supporting-bars which have their forward ends curled upwardly to prevent their catching on the ground and the approximately U-shaped screw-clamps for adjustably securing the supporting-bars upon the axle, substantially as described.

3. A roller-skate, comprising an axle, two wheels mounted upon said axle and adapted to rotate parallel to one another, two intermediate bars secured to said axle by means of screw-clamps and said bars having their forward ends curled upwardly to prevent their catching on the ground, and said bars coacting with rubber washers which are securely held by means of pins between said bars and the foot-plate to form a resilient support for said foot-plate, substantially as shown and described.

In testimony whereof I affix my signature in presence of two witnesses.

WILLIAM S. FULTON.

Witnesses:
    GEO. F. ABBOTT,
    CHAS. I. ROWE.